United States Patent
Lopes Agnese et al.

(10) Patent No.: US 12,290,063 B2
(45) Date of Patent: May 6, 2025

(54) METHOD FOR GENERATING AN APPLICATION MAP FOR TREATING A FIELD WITH AN AGRICULTURAL EQUIPMENT

(71) Applicant: BASF Agro Trademarks GmbH, Ludwigshafen am Rein (DE)

(72) Inventors: Mauricio Lopes Agnese, Cologne (DE); Marek Piotr Schikora, Cologne (DE); Umit Baran Ilbasi, Sao Paulo (BR); Holger Hoffmann, Langenfeld (DE); Thomas Rommel, Langenfeld (DE); Mirwaes Wahabzada, Cologne (DE); Sandra Selinger, Langenfeld (DE)

(73) Assignee: BASF Agro Trademarks GmbH, Ludwigshafen am Rhein (DE)

( * ) Notice: Subject to any disclaimer, the term of this patent is extended or adjusted under 35 U.S.C. 154(b) by 496 days.

(21) Appl. No.: 17/626,694

(22) PCT Filed: Jul. 13, 2020

(86) PCT No.: PCT/EP2020/069786
§ 371 (c)(1),
(2) Date: Jan. 12, 2022

(87) PCT Pub. No.: WO2021/009136
PCT Pub. Date: Jan. 21, 2021

(65) Prior Publication Data
US 2022/0256834 A1 Aug. 18, 2022

(30) Foreign Application Priority Data
Jul. 15, 2019 (EP) .................................... 19186343

(51) Int. Cl.
*G06V 20/17* (2022.01)
*A01M 21/04* (2006.01)
(Continued)

(52) U.S. Cl.
CPC ........... *A01M 21/04* (2013.01); *G06T 3/4038* (2013.01); *G06T 7/0012* (2013.01); *G06V 10/70* (2022.01);
(Continued)

(58) Field of Classification Search
CPC .... G06V 20/188; G06V 10/764; G06V 10/82; G06T 2207/30188; G06T 2207/20081; G06T 2207/20084
See application file for complete search history.

(56) References Cited

U.S. PATENT DOCUMENTS

| | | | |
|---|---|---|---|
| 6,216,614 B1 * | 4/2001 | Wollenhaupt | A01C 23/00 111/900 |
| 2001/0036295 A1 * | 11/2001 | Hendrickson | G06V 20/13 382/110 |

(Continued)

FOREIGN PATENT DOCUMENTS

| | | | | |
|---|---|---|---|---|
| EP | 3287007 A1 * | 2/2018 | ......... | A01M 21/043 |
| WO | 9821943 A1 | 5/1998 | | |
| WO | 2019081375 A1 | 5/2019 | | |

OTHER PUBLICATIONS

López-Granados et al., Early season weed mapping in sunflower using UAV technology: variability of herbicide treatment maps against weed thresholds. Precision Agric 17, pp. 183-199 (2016), doi.org/10.1007/s11119-015-9415-8.*

(Continued)

*Primary Examiner* — Guillermo M Rivera-Martinez
(74) *Attorney, Agent, or Firm* — ArentFox Schiff LLP

(57) ABSTRACT

Method for generating an application map (20) for treating a field with an agricultural equipment comprising the fol-
(Continued)

---

S10: providing a field map of a field to be treated

S20: determining areas in the field map with a weed and/or pest infestation by using an image classification algorithm

S30: generating an application map specifying areas for treating the field with an agricultural equipment

S40: generating control data and/or a control map configured to be used for controlling an agricultural equipment lowing steps: providing (S10) a field map (10) of a field to be treated; determining (S20) areas in the field map (10) with a weed and/or pest infestation by using an image classification algorithm; and generating (S30) an application map (20) specifying areas for treating the field with an agricultural equipment, wherein the application map (20) is based on the determined areas infested by weed and/or pest infestation; wherein the method further comprises the step of providing boundary data with respect to the field.

15 Claims, 5 Drawing Sheets

(51) Int. Cl.
G06T 3/4038 (2024.01)
G06T 7/00 (2017.01)
G06V 10/70 (2022.01)
G06V 20/10 (2022.01)

(52) U.S. Cl.
CPC ............ *G06V 20/17* (2022.01); *G06V 20/188* (2022.01); *B64U 2201/104* (2023.01); *G06T 2207/10032* (2013.01); *G06T 2207/20081* (2013.01); *G06T 2207/30188* (2013.01)

(56) References Cited

U.S. PATENT DOCUMENTS

| | | |
|---|---|---|
| 2009/0226036 A1 | 9/2009 | Gaal |
| 2014/0012732 A1* | 1/2014 | Lindores ............... A01B 79/005 705/37 |
| 2014/0311014 A1* | 10/2014 | Feugier ................. A01M 1/026 43/107 |
| 2017/0223947 A1* | 8/2017 | Gall ..................... A01B 79/005 |
| 2017/0228118 A1* | 8/2017 | Sugumaran ........ G01N 33/0098 |
| 2018/0330492 A1* | 11/2018 | Tagestad ............... G06T 7/0004 |
| 2018/0349745 A1* | 12/2018 | Fryshman .............. B64D 47/08 |
| 2019/0050948 A1* | 2/2019 | Perry ..................... G06F 30/27 |
| 2019/0073534 A1* | 3/2019 | Dvir ....................... G06V 10/56 |
| 2019/0107521 A1* | 4/2019 | Riley ....................... G01K 3/14 |
| 2019/0150357 A1* | 5/2019 | Wu ........................ H04N 7/188 |
| 2019/0191617 A1 | 6/2019 | Hoffmann et al. |
| 2021/0158041 A1* | 5/2021 | Chowdhary ......... G05D 1/0272 |

OTHER PUBLICATIONS

International Search Report and Written Opinion of International Application No. PCT/EP2020/069786 mailed Sep. 17, 2020, 12 pgs.

* cited by examiner

S10: providing a field map of a field to be treated

S20: determining areas in the field map with a weed and/or pest infestation by using an image classification algorithm

S30: generating an application map specifying areas for treating the field with an agricultural equipment

S40: generating control data and/or a control map configured to be used for controlling an agricultural equipment

Figure 1

METHOD FOR GENERATING AN APPLICATION MAP FOR TREATING A FIELD WITH AN AGRICULTURAL EQUIPMENT

CROSS-REFERENCE TO RELATED APPLICATIONS

This application is a national stage entry under 35 U.S.C. § 371 of International Application No. PCT/EP2020/069786, filed on Jul. 13, 2020, which claims the benefit of priority of European Patent Application No. 19186343.0, filed on Jul. 15, 2019, the disclosures of which are hereby incorporated by reference herein in their entireties.

FIELD OF THE INVENTION

The present invention relates to a method for generating an application map for treating a field with an agricultural equipment and the use of a field map, an application map and image collection path data in such a method. Moreover, the present invention also relates to an agricultural equipment controlled by control data and/or a control map provided by a method according to the present invention.

BACKGROUND OF THE INVENTION

In the prior art, it is common practice that most of the crop protection products are applied across the whole field even though weeds or pests only apply on a fraction of a field. Typically, it is too complicated or time-consuming for a user to perform an accurate analysis of the field to determine where exactly treatment is needed in the field. In addition, it is difficult to control and move an agricultural equipment in such a way that the field is only treated where necessary.

In this respect, it is found that a further need exists to provide a method that allows a user to be informed as easily and quickly as possible where in the field an application should/must be made.

SUMMARY OF THE INVENTION

In the view of the above, it is an object of the present invention to provide a method for generating an application map for treating a field with an agricultural equipment. A further object of the present invention is to provide method that can be carried out most automatically and can provide a user with control data or a control map for an agricultural equipment in a simple and fast manner.

These and other objects, which become apparent upon reading the following description, are solved by the subject matter of the independent claims. The dependent claims refer to preferred embodiments of the invention.

According to the invention, a method for generating an application map for treating a field with an agricultural equipment is provided comprising the following steps:
  providing a field map of a field to be treated;
  determining areas in the field map with a weed and/or pest infestation by using an image classification algorithm;
  generating an application map specifying areas for treating the field with an agricultural equipment, wherein the application map is based on the determined areas infested by weed and/or pest infestation; and wherein the method further comprises the step of providing boundary data with respect to the field.

The field map is preferably generated based on at least one image of the field, wherein the field map is preferably based on several images of the field and/or parts of the field which can be stitched together by a respective algorithm to provide the field map. The images are preferably high-resolution images sufficient for a respective image analysis. If necessary, the field can be divided into suitable segments so that an accordingly high resolution can be provided suitable for the analysis by an image classification algorithm. In this respect, it is further preferred that the images for generating/providing the field map are provided by at least one image collection device, wherein the image collection device is preferably an aircraft device and most preferably a drone. However, the present invention is not limited to a specific method for providing a field map and also not to a specific image collection device. From a geographical point of view, the field map covers at least the area of a field to be treated, which may be a "complete" field or only part of a field. Finally, a field map may also comprise several geographically separate individual fields. In this context, it should be noted that the images may be created by a user and/or by a third party.

Notably, the term agricultural equipment is to be understood broadly and comprises any land or air supported device/machine suitable to treat a field for weed and/or pest infestation management. However, the agricultural equipment is preferably a spraying machine with which preferably herbicides and/or insecticide can be applied to the field. In addition or alternatively, an agricultural equipment is a mechanical/electrical device for mechanically or electrically removing weed/pest infestation from the field.

In the application map respective areas which need to be treated by the agricultural equipment are specified based on the results of the image classification. Notably, the term application map is to be understood broadly and includes also corresponding data sets with position coordinates that are not represented in a visual form.

In other words, the present invention allows to provide the user with an application map by means of an automatically executable method, which provides him the information where in the field he should carry out a respective application, i.e. the user receives the information where he should use herbicides and/or insecticide in the field and where this is not necessary. Thus, by means of the present invention, a significant reduction in crop protection products and a more sustainable, environmental friendly and economically viable crop production can be provided. Moreover, by reducing the total volumes of herbicides/insecticides needed for a treatment, the present invention also allows to apply more often, more effective and potentially more expensive herbicides and/or insecticides.

It is preferred that the method further comprises the step of generating control data and/or a control map configured to be used for controlling an agricultural equipment. The control data/control map can, for example, be provided as control commands for the agricultural equipment, which can, for example, be read into a data memory of the agricultural equipment before the treatment of the field, for example, by means of a wireless communication interface, by a USB-interface or the like. In this context, it is preferred that the control data allow a more or less automated treatment of the field, i.e. that, for example, a sprayer automatically dispenses the desired herbicides and/or insecticides at the respective coordinates without the user having to intervene manually. It is particularly preferred that the control data also include control commands for driving off the field. It is to be understood that the present invention is not limited to a specific content of the control data, but may comprise any data needed to operate an agricultural equipment.

Preferably, the method further comprises the steps of providing boundary data with respect to the field and generating image collection path data for at least one image collection device, wherein the image collection path data preferably comprises data with respect to path locations, position marks, flight heights, landing zones and/or image locations. Preferably, an analysis algorithm is used for optimize a collection path, e.g. maximum coverage in minimal time with minimal number of breaks, landings etc. In this respect, it is further preferred that the image collection device comprises a communication interface configured to directly or indirectly send the collected images to a computer device, wherein the computer device is preferably configured to execute the image classification algorithm and to generate the application map. The term computer device is broadly understood and includes all appropriate means on which the image classification algorithm can be executed, for example, cloud computing solutions, a centralized or decentralized computer system, a computer center, etc. In an example, the method comprises the step of providing boundary data which are used for generating/providing the field map and/or the application map, i.e. the boundary data in this example are not further used for generating image collection path data, even if this is preferred.

It is preferred that the images are automatically transferred from the image collection device to the computer device, e.g. via an upload center or a cloud connectivity during collection using an appropriate wireless communication interface, e.g. a mobile interface, long range WLAN etc. Even if it is preferred that the collected images are transferred via a wireless communication interface, it is also possible that the image collecting device comprises a on-site data transfer interface, e.g. a USB-interface, from which the collected images may be received via a manual transfer and which are then transferred to a respective computer device for further processing.

It is further preferred that after receiving the images by the computer device(s) an automatic workflow is triggered comprising the following steps: stitching the images to a field map, running the image classification algorithm and determining the areas in the field map with a weed and/or pest infestation, generating the application map and the control data/control map and directly or indirectly transferring the application map and/or the control data/control map to an agricultural equipment/user.

Preferably, the application map is divided in cells, preferably in polygon-shaped cells, wherein for each cell a weed and/or pest infestation value is preferably provided, wherein the weed and/or pest infestation value is preferably provided as percent value. In this respect, it is further preferred that the control data and/or control map is divided in cells corresponding to the cells of the application map and wherein a threshold value for each cell is applied when generating the control data and/or control map such that the cells having a weed and/or pest infestation above the threshold value are flagged for a treatment by the agricultural equipment. The threshold value can be determined by a user or might be a default value. Moreover, it is also possible to adopt a threshold value dependent from the specific kind of weed and/or pest infestation.

It is further preferred that when generating the control data and/or control map also the neighboring cells of a cell having a weed and/or pest infestation above the threshold value are flagged for a treatment by the agricultural equipment. Thereby, it is possible to provide an error compensation by treating also the neighboring cells of cells having a weed and/or pest infestation above the threshold to compensate potential positioning errors, e.g. GPS-errors.

Preferably, the control data and/or control map comprises associated application rate data and/or a recommended herbicides and/or insecticide data. The provision of an appropriate recommendation can speed up the whole process as a user does not have to spend a lot of time identifying appropriate herbicides/insecticides or mixtures he can use.

It is preferred that the image classification algorithm is based on the results of a machine learning algorithm, e.g. neural networks. In other words, it is preferred that the field map, e.g. the stitched images, are fed to a trained machine learning algorithm to determine weed and/or pest infestation on the field. The machine learning algorithm preferably comprises decision trees, random forests, naive bayes classifications, nearest neighbors, neural networks, convolutional neural networks preferably fully convolutional network, generative adversarial networks, support vector machines, linear regression, logistic regression, random forest and/or gradient boosting algorithms. Preferably, the machine learning algorithm is organized to process an input having a high dimensionality into an output of a much lower dimensionality. Such a machine learning algorithm is termed "intelligent" because it is capable of being "trained" to map the input space compromising of all possible inputs to desired outputs in the output space. The algorithm may be trained using records of training data. A record of training data comprises training input data and corresponding training output data. Training output data is also called a label. Training input data and corresponding labels can be collected based on individual pixels of training input data, bounding boxes of wanted objects, object instance segmentation or as a general segmentation mask. The training output data of a record of training data is the result that is expected to be produced by the machine learning algorithm when being given the training input data of the same record of training data as input. The deviation between this expected result and the actual result produced by the algorithm is observed and rated by means of a "loss function". This loss function is used as a feedback for adjusting the parameters of the internal processing chain of the machine learning algorithm. For example, the parameters may be adjusted with the optimization goal of minimizing the values of the loss function that result when all training input data is fed into the machine learning algorithm and the outcome is compared with the corresponding training output data. The result of this training is that given a relatively small number of records of training data as "ground truth", the machine learning algorithm is enabled to perform its job well for a number of records of input data that may be higher by many orders of magnitude. The machine learning algorithm may also be further improved by active learning. This includes looking at the outcome of the selected input data which not contained in the training input data (e.g. selecting input data in whose prediction the machine learning algorithm was the least "confident"), correcting all mistakes which the machine learning algorithm made and including their inputs and correct outputs in the new training data for use in re-training of the machine learning algorithm. Such training might help the machine learning algorithm to learn faster.

Additionally, machine learning algorithm may be trained separately or even the choice of machine learning algorithm may differ in certain conditions, e.g. whether the crop has already emerged or not. Furthermore, in case when the crop has already emerged, it is beneficial to ensure rotational invariance of the result. In other words, the machine learning model shall be trained preferably using random rotational augmentation in order to support crop rows sown at any angle, as it is improbable that training data will include all possible angles. Another way can include preprocessing of the input in a way which ensures that crop rows in training data and during usage of the trained machine learning algorithm will always be at the same angle.

The machine learning algorithm works particularly well when input data is consistent, so following the data acquisition process in a consistent way (e.g. similar time of day) can be beneficial. Notably, in an example, a so called random forest method is applied or a AlexNet-like convolutional neural network is implemented as a fully convolutional network. However, the present disclosure is not limited to such a preferred example.

Preferably, once the treatment of the field is completed an as applied map/as applied data is provided to a computer device, e.g. for documentation and analytics purposes. In this respect, it is preferred that it is determined whether inconsistencies between the provided control map/control data and the as applied map/as applied data occurred, wherein in case of inconsistencies above a predetermined threshold value occurred, a further treatment of the field is preferably recommended.

The present invention also related to a use of a field map in a method for generating an application map for treating a field with an agricultural equipment as described above for determining areas in the field map with a weed and/or pest infestation by using an image classification algorithm. Moreover, the present invention also relates to an use of an application map in a method for generating an application map for treating a field with an agricultural equipment as described above for generating control data and/or a control map configured to be used for controlling an agricultural equipment, wherein the agricultural equipment is preferably a spraying machine or a mechanical/electrical control device. In addition, the present invention relates to an use of image collection path data in a method for generating an application map for treating a field with an agricultural equipment as described above, wherein the image collection path data comprises data with respect to path locations, position marks, flight heights, landing zones and/or image locations. Finally, the present invention relates to an agricultural equipment configured to be controlled by control data and/or a control map provided by a method for generating an application map for treating a field with an agricultural equipment as described above.

Moreover, the present invention also relates to a system for generating an application map (20) for treating a field with an agricultural equipment, comprising: at least one processing unit configured to generate and provide a field map of a field to be treated; at least one processing unit configured to determine areas in the field map with a weed and/or pest infestation by using an image classification algorithm; at least one processing unit configured to generate and provide an application map specifying areas for treating the field with an agricultural equipment, wherein the application map is based on the determined areas infested by weed and/or pest infestation.

Finally, the present invention also relates to a computer program or computer program element configured to execute the above explained method, on an appropriate apparatus or system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses invention.

Further on, the computer program element might be able to provide all necessary steps to fulfill the procedure of an exemplary embodiment of the method as described above.

According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

In the following, a non-exhaustive list of non-limiting examples is provided. Any one or more of the features of these examples may be combined with any one or more features of another example, embodiment, or aspect described herein.

A. Method for generating an application map (20) for treating a field with an agricultural equipment comprising the following steps:
   providing (S10) a field map (10) of a field to be treated;
   determining (S20) areas in the field map (10) with a weed and/or pest infestation by using an image classification algorithm; and
   generating (S30) an application map (20) specifying areas for treating the field with an agricultural equipment, wherein the application map (20) is based on the determined areas infested by weed and/or pest infestation.

B. Method according to embodiment A, wherein the method further comprises the step of generating (S40) control data and/or a control map (30) configured to be used for controlling an agricultural equipment, wherein the agricultural equipment is preferably a spraying machine or a mechanical/electrical control device.

C. Method according to embodiment A or embodiment B, wherein the field map (10) is generated based on at least one image of the field, wherein the field map (10) is preferably based on several images of the field and/or parts of the field, wherein the several images are preferably stitched together to provide the field map (10).

D. Method according to embodiment C, wherein the at least one image or the several images are provided by at least one image collection device wherein the image collection device is preferably an aircraft device and most preferably a drone.

E. Method according to embodiment D, wherein the method further comprises the steps of providing boundary data with respect to the field and generating image collection path data for at least one image collection device, wherein the image collection path data preferably comprises data with respect to path locations, position marks, flight heights, landing zones and/or image locations.

F. Method according to embodiment D or embodiment E, wherein the image collection device comprises a communication interface configured to directly or indirectly send the collected images to a computer device, wherein the computer device is preferably configured to execute the image classification algorithm and to generate the application map (20).

G. Method according to any one of the preceding embodiments A to F, wherein the application map (20) is divided in cells, preferably in polygon-shaped cells, and wherein for each cell a weed and/or pest infestation value is preferably provided, wherein the weed and/or pest infestation value is preferably provided as percent value.

H. Method according to embodiment G, wherein the control data and/or control map (30) is divided in cells corresponding to the cells of the application map (20) and wherein a threshold value for each cell is applied when generating the control data and/or control map (30) such that the cells having a weed and/or pest infestation above the threshold value are treated by the agricultural equipment.

I. Method according to embodiment H, wherein when generating the control data and/or control map (30) also the neighboring cells of a cell having a weed and/or pest infestation above the threshold value are treated by the agricultural equipment.

J. Method according to any one of the embodiment G to H, wherein the control data and/or control map (30) comprises associated application rate data and/or recommended herbicides and/or insecticide data.

K. Method according to any one of the preceding embodiment A to J, wherein the image classification algorithm is based on the results of a machine-learning algorithm.

L. Use of a field map (10) in a method according to any one of the embodiment A to K for determining areas in the field map (10) with a weed and/or pest infestation by using an image classification algorithm.

M. Use of an application map (20) in a method according to any one of the embodiment A to K for generating control data and/or a control map (30) configured to be used for controlling an agricultural equipment, wherein the agricultural equipment is preferably a spraying machine or a mechanical/electrical control device.

N. Use of image collection path data in a method according to any one of the embodiments A to K, wherein the image collection path data comprises data with respect to path locations, position marks, flight heights, landing zones and/or image locations.

O. Agricultural equipment configured to be controlled by control data and/or a control map (30) provided by a method according to any one of embodiment A to K.

P. A system for generating an application map (20) for treating a field with an agricultural equipment, comprising:

at least one processing unit configured to generate and provide a field map (10) of a field to be treated;

at least one processing unit configured to determine areas in the field map (10) with a weed and/or pest infestation by using an image classification algorithm;

at least one processing unit configured to generate and provide an application map (20) specifying areas for treating the field with an agricultural equipment, wherein the application map (20) is based on the determined areas infested by weed and/or pest infestation.

Q. A computer program element which when executed by a processor is configured to carry out the method of embodiment according to any of embodiment A to K.

BRIEF DESCRIPTION OF THE DRAWINGS

In the following, the invention is described exemplarily with reference to the enclosed figure, in which FIG. 1 is a schematic view of a method according to the preferred embodiment of the present invention;

DETAILED DESCRIPTION OF AN EMBODIMENT

Figure 2:
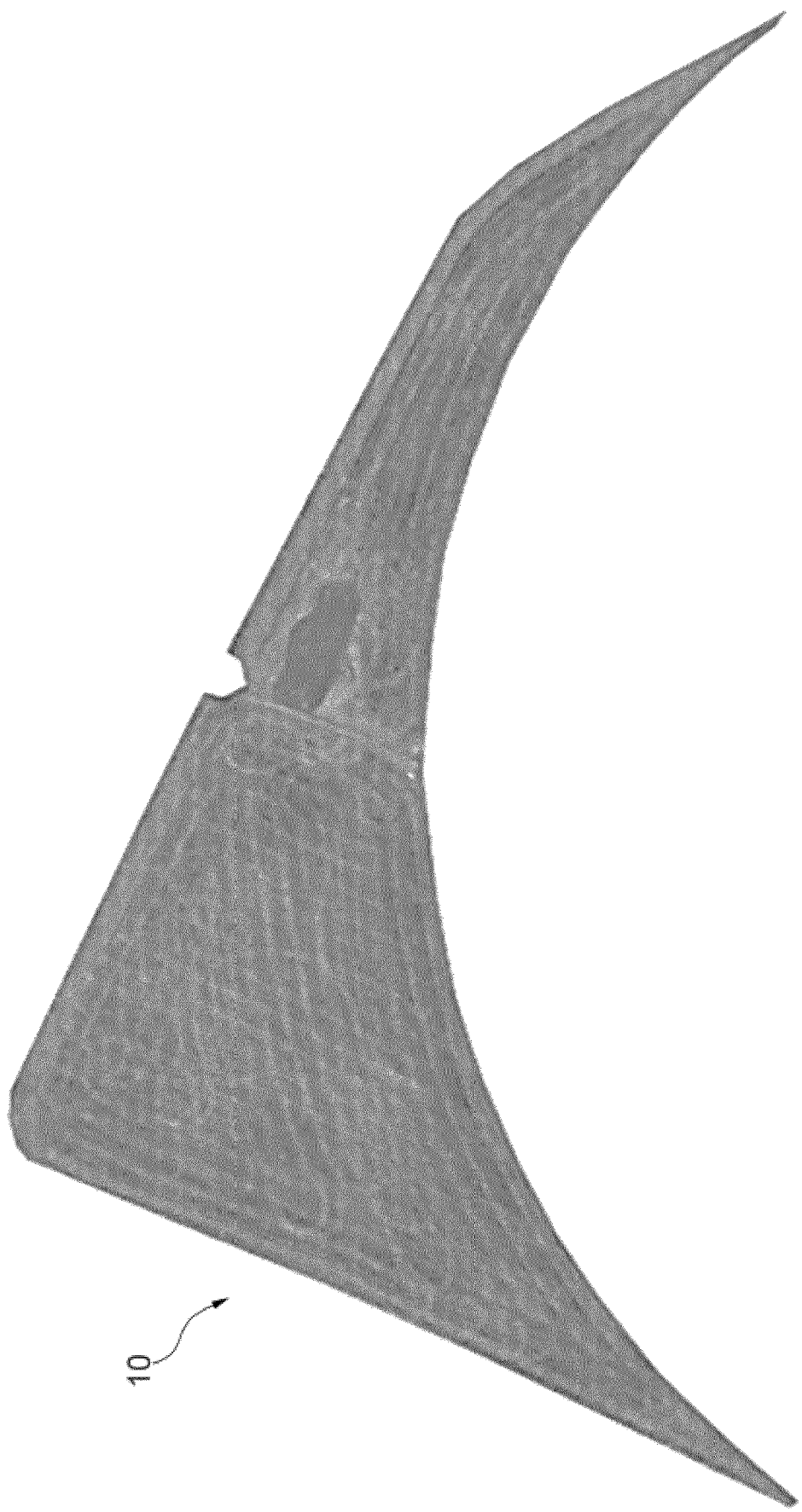
FIG. 2 is a schematic view of a field map used in the preferred embodiment of the invention.
Figure 3:
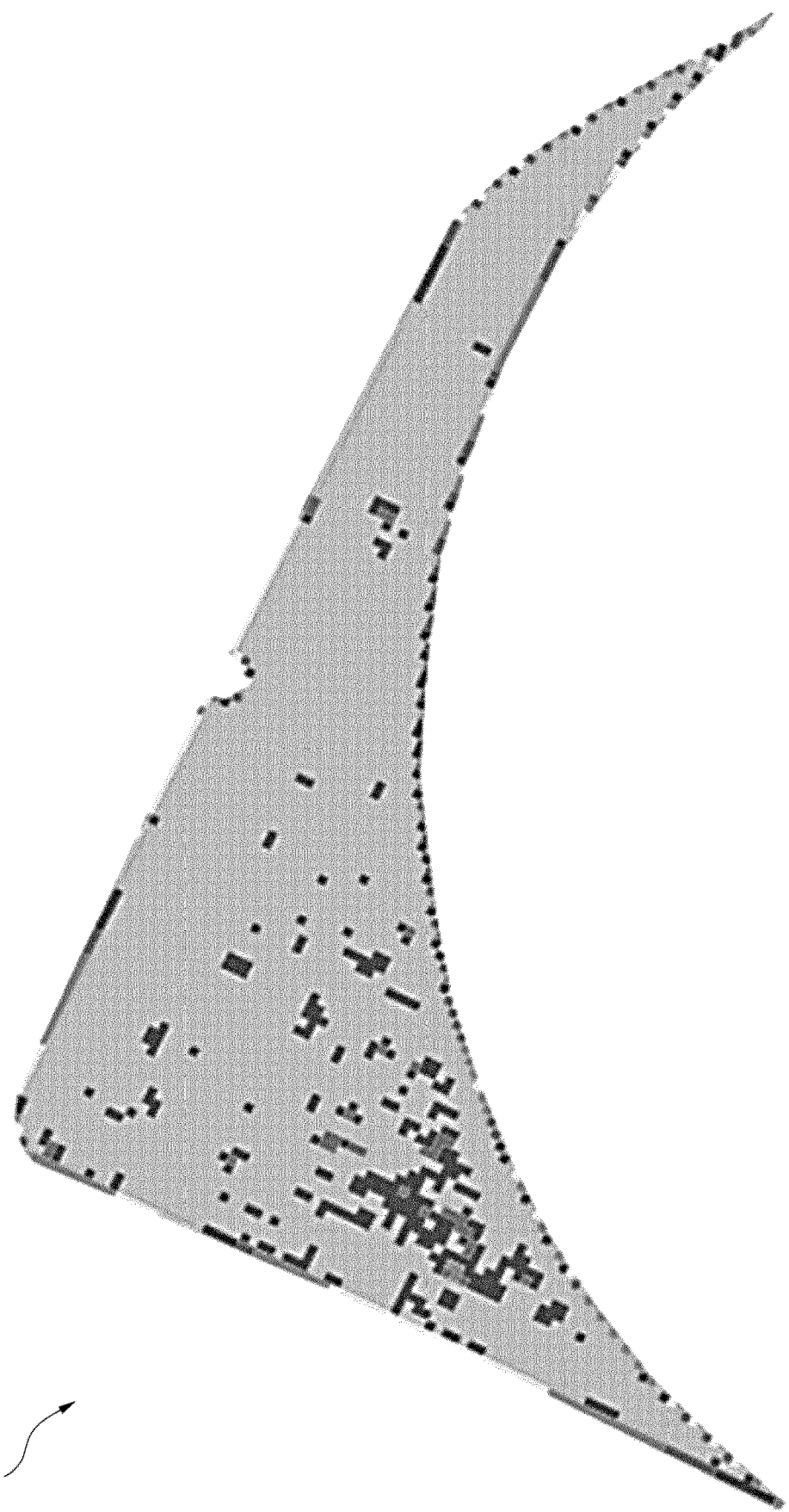
FIG. 3 is a schematic view of an application map used in the preferred embodiment of the invention.
Figure 4:
FIG. 4 is a schematic view of a control map used in the preferred embodiment of the invention.

FIG. 1 is a schematic view of a method according to a preferred embodiment of the present invention. In the following, an exemplary order of the steps according to the preferred embodiment of the present invention is explained in view of a field map 10 shown in FIG. 2, an application map 20 shown in FIG. 3 and a control map 30 shown in FIG. 4.

In a step S10, a field map 10 of a field to be treated is provided. In the preferred embodiment, images have been taken by an image collection device, here a drone. In this respect, image collection path data have been provided to the drone comprising data with respect to path locations, position marks, flight heights, landing zones and/or image locations. The image collection path data have been generated based on the predetermined boundaries of the field using an analysis algorithm optimizing the collection path, i.e. providing maximum coverage in minimal time with minimal number of breaks, landings etc. This makes it possible for the drone to automatically take the individual images without a user having to control the drone. The images have been provided to a computer device for stitching the taken images together and for providing/generating the field map 10. Notably, the individual images can be transmitted immediately after they have been taken or after all images have been taken as a group. In this respect, it is preferred that the image collection device comprises a respective communication interface configured to directly or indirectly send the collected images to the computer device, e.g. cloud computing solutions, a centralized or decentralized computer system, a computer center, etc. Preferably, the images are automatically transferred from the image collection device to the computer device, e.g. via an upload center or a cloud connectivity during collection using an appropriate wireless communication interface, e.g. a mobile interface, long range WLAN etc. Even if it is preferred that the collected images are transferred via a wireless communication interface, it is also possible that the image collecting device comprises an on-site data transfer interface, e.g. a USB-interface, from which the collected images may be received via a manual transfer and which are then transferred to a respective computer device for further processing.

In a step S20, it is the areas are determined in the filed map with a weed and/or pest infestation by using an image classification algorithm. In this respect, it is preferred that the image classification algorithm is based on the results of a machine learning algorithm, e.g. neural networks. In other words, it is preferred that the field map 10, e.g. the stitched images, are fed to a trained machine learning algorithm to determine weed and/or pest infestation on the field. In a step S30, an application map 20 is generated based on the results of the image classification algorithm specifying areas for treating the field with an agricultural equipment. Notably, the application map 20 can be divided in cells, preferably in polygon-shaped cells, wherein for each cell a weed and/or pest infestation value can be provided, wherein the weed and/or pest infestation value is preferably provided as percent value.

In a preferred step S40, a control map 30 is generated which is configured to be used for controlling an agricultural equipment. The control data/control map 30 can, for example, be provided as control commands for the agricultural equipment, which can, for example, be read into a data memory of the agricultural equipment before the treatment of the field, for example, by means of a wireless communication interface, by a USB-interface or the like. In this context, it is preferred that the control data allow a more or less automated treatment of the field, i.e. that, for example, a sprayer automatically dispenses the desired herbicides and/or insecticides at the respective coordinates without the user having to intervene manually. It is particularly preferred that the control data also include control commands for driving off the field. It is to be understood that the present invention is not limited to a specific content of the control data, but may comprise any data needed to operate an agricultural equipment. It is possible to divide the control map 30 in cells corresponding to the cells of the application map 20 and wherein a threshold value for each cell is applied when generating the control map 30 such that the cells having a weed and/or pest infestation above the threshold value are flagged for a treatment by the agricultural equipment. The threshold value can be determined by a user or might be a default value. Moreover, it is also possible to adopt a threshold value dependent from the specific kind of weed and/or pest infestation. When generating the control map 30 also the neighboring cells of a cell having a weed and/or pest infestation above the threshold value can be flagged for a treatment by the agricultural equipment. Thereby, it is possible to provide an error compensation by treating also the neighboring cells of cells having a weed and/or pest infestation above the threshold to compensate potential positioning errors, e.g. GPS-errors.

Notably, it is preferred that an application map 20 and/or control data/a control map 30 can be provided more or less automatically. In this respect, it is preferred that after receiving the images by the computer device(s), an automatic workflow is triggered comprising the following steps: stitching the images to a field map 10, providing S10 the field map 10, running the image classification algorithm and determining S20 the areas in the field map 10 with a weed and/or pest infestation, generating S30 the application map 20 and generating S40 the control data/control map 30 and directly or indirectly transferring the application map 20 and/or the control data/control map 30 to an agricultural equipment/user.

Figure 5:
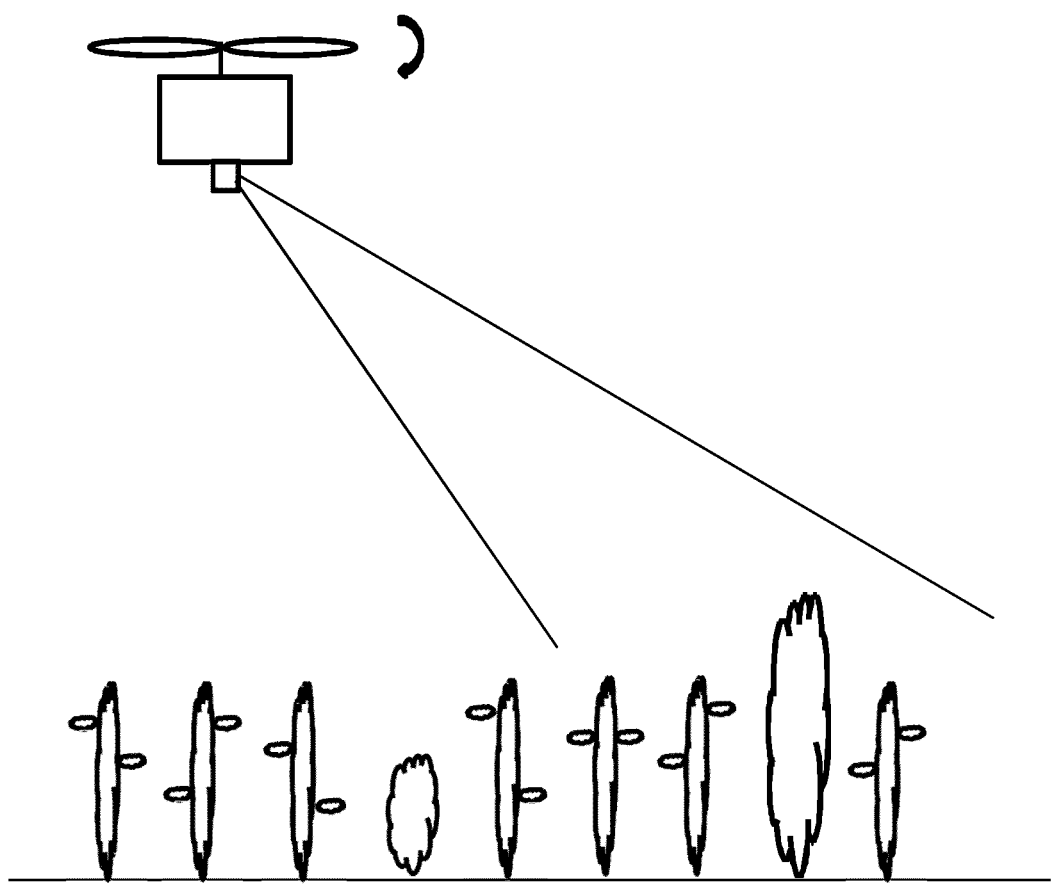
FIG. 5 is a schematic view of a robotic vehicle acquiring imagery of a field.

FIG. 5 shows an unmanned aerial vehicle (UAV), e.g. a drone, flying over a field containing a crop, which can be used for providing/acquiring images of a field. In the crop there may be a number of weeds/pathogens, wherein two particular and different weed types are shown as an example in FIG. 5. One weed type, the taller weed shown in FIG. 5, is particularly virulent, produces numerous seeds and can significantly affect the crop yield. This weed should not be tolerated in the field containing this crop. However, it is also possible that a second type of weed shown in FIG. 5 as the shorter weed, can be beneficial to the overall biodiversity for the crop in the field, with the proviso that the number density of this weed per unit area is below a threshold value.

The UAV has a camera, and as it flies over the field imagery is acquired. The UAV also has a GPS and inertial navigation system, which enables both the position of the UAV to be determined and the orientation of the camera also to be determined. From this information the footprint of an image on the ground can be determined, such that particular parts in that image, such as the example of the first type of weed, can be located with respect to absolute geospatial coordinates. The image data acquired by the camera is preferably transferred to a processing unit external to the UAV for generating the field map. However, it is also possible that a respective program is located in the UAV such that the field map can also be provided directly by the UAV.

The present invention has been described in conjunction with a preferred embodiment as examples as well. However, other variations can be understood and effected by those persons skilled in the art and practicing the claimed invention, from the studies of the drawings, this disclosure and the claims. Notably, the present invention is not limited to a specific order of these steps. Moreover, it is also not required that the different steps are performed at a certain place or at one place, i.e. each of the steps may be performed at a different place using different equipment/data processing units. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

REFERENCE SIGNS

S10 providing a field map of a field to be treated
S20 determining areas in the field map with a weed and/or pest infestation by using an image classification algorithm
S30 generating an application map specifying areas for treating the field with an agricultural equipment
S40 generating control data and/or a control map configured to be used for controlling an agricultural equipment
10 field map of a field to be treated
20 application map specifying areas for treating the field with an agricultural equipment
30 a control map configured to be used for controlling an agricultural equipment

What is claimed is:

1. A method comprising:
generating, based at least in part on boundary data associated with a field to be treated, path data associated with a path to be travelled by an image collection device to collect a set of images associated with the field;
generating, based on the set of images, a field map of the field to be treated;
determining, using an image classification algorithm applied to the set of images, one or more infestation areas in the field map comprising one or more of a weed infestation or a pest infestation; and
generating an application map specifying one or more cells relating to the one or more infestation areas of the field to be treated using agricultural equipment.

2. The method according to claim 1, further comprising generating control data configured to be used to control the agricultural equipment, wherein the agricultural equipment is at least one of a spraying machine or a control device.

3. The method according to claim 1, wherein the field map is generated based on the set of images by stitching together images from the set of images.

4. The method according to claim 1, wherein the image collection device is an aircraft device.

5. The method according to claim 1, further comprising generating image collection path data for at least one image collection device.

6. The method according to claim 5, wherein the at least one image collection device comprises a communication interface configured to send the set of images to a computer device, wherein the computer device is configured to execute the image classification algorithm to generate the application map.

7. The method according to claim 1, wherein the application map is divided in cells, and wherein for each cell, at least one of a weed infestation value or a pest infestation value is provided as a percent value.

8. The method according to claim 7, wherein control data is divided in cells corresponding to the cells of the application map, and wherein a threshold value for each cell is applied when generating the control data such that the cells having the at least one of the weed infestation value or pest infestation value above the threshold value are treated by the agricultural equipment.

9. The method according to claim 8, wherein when generating the control data, one or more neighboring cells of an identified cell having the at least one of the weed infestation value or pest infestation value above the threshold value are treated by the agricultural equipment.

10. The method according to claim 7, wherein control data comprises one or more of application rate data, recommended herbicides, or insecticide data.

11. The method according to claim 1, wherein the image classification algorithm is based on results of a machine learning algorithm.

12. The method according to claim 1, further comprising generating, based on the application map, control data to be used to control the agricultural equipment.

13. The method according to claim 1, wherein the path data comprises data associated with one or more of path locations, position marks, flight heights, landing zones, or image locations.

14. A system comprising:
at least one processing unit configured to generate, based at least in part on boundary data associated with a field to be treated, path data associated with a path to be travelled by an image collection device to collect a set of images associated with the field;
at least one processing unit configured to generate, based on the set of images, a field map of the field to be treated;
at least one processing unit configured to determine, using an image classification algorithm applied to the set of images, one or more infestation areas in the field map comprising one or more of a weed infestation or a pest infestation; and
at least one processing unit configured to generate an application map specifying one or more cells relating to the one or more infestation areas of the field to be treated using agricultural equipment.

15. A non-transitory computer-readable medium storing instructions that, when executed by one or more processors of a computing device, cause the one or more processors to:
generating, based at least in part on boundary data associated with a field to be treated, path data associated with a path to be travelled by an image collection device to collect a set of images associated with the field;
generating, based on the set of images, a field map of the field to be treated;
determining, using an image classification algorithm applied to the set of images, one or more infestation areas in the field map comprising one or more of a weed infestation or a pest infestation; and
generating an application map specifying one or more cells relating to the one or more infestation areas of the field to be treated using agricultural equipment.

* * * * *